Dec. 31, 1946.  C. NYGREN  2,413,645
STUFFING BOX FOR WATER COOLED SHAFTS
Filed April 12, 1944   3 Sheets-Sheet 1
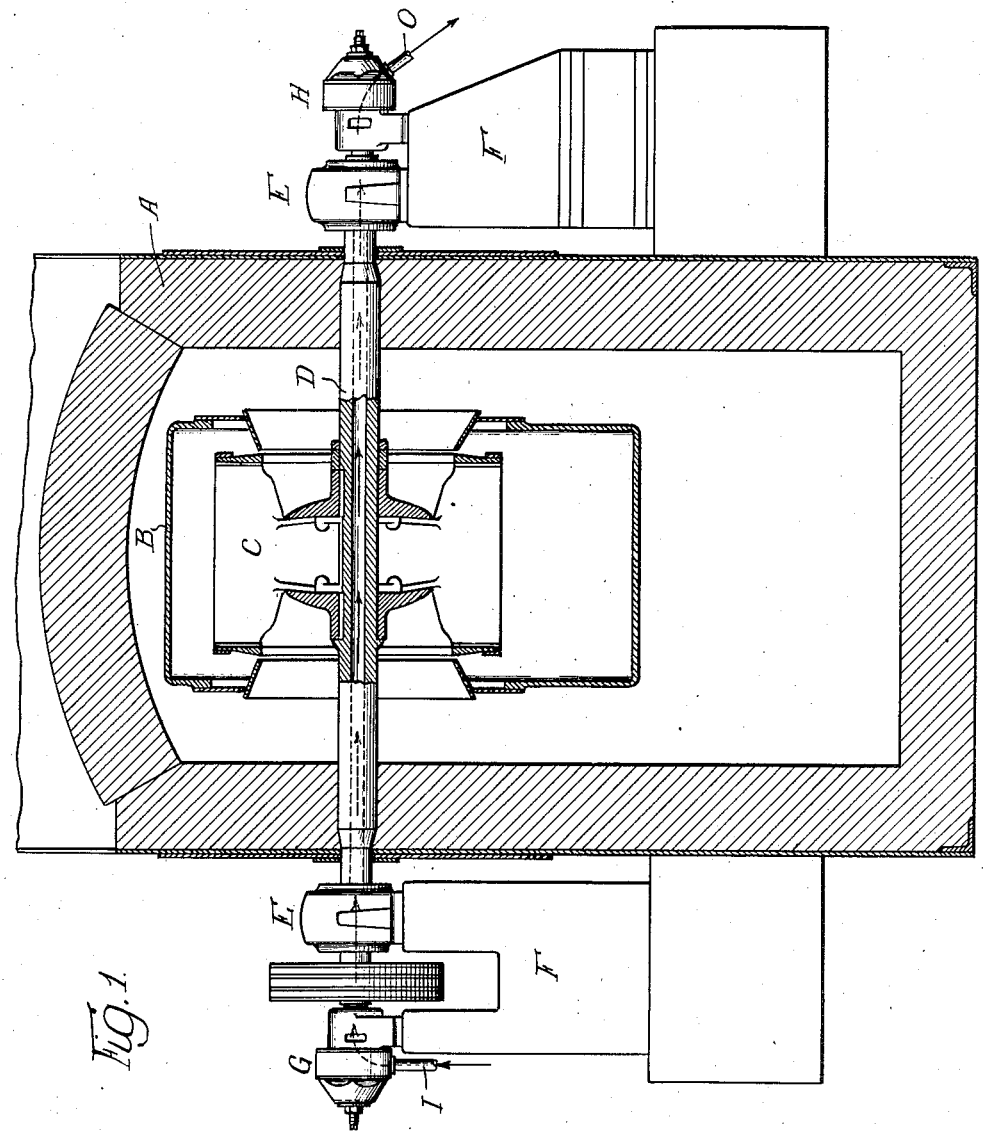
INVENTOR.
Carl Nygren,
BY
Atty's.

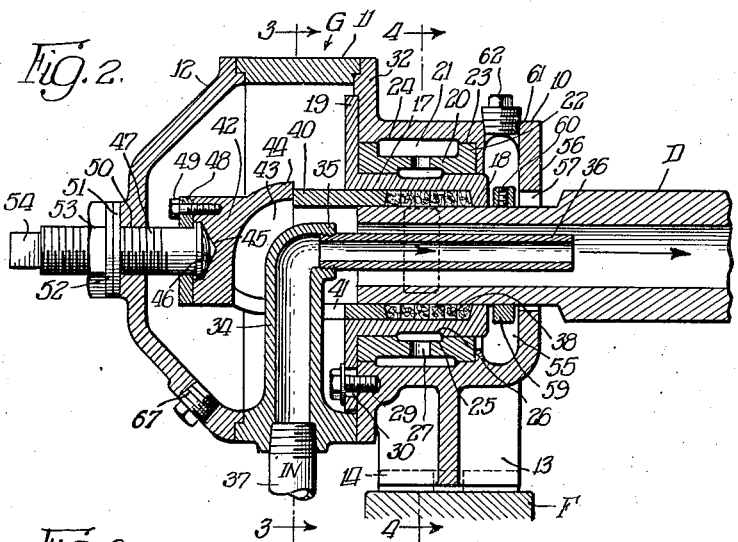

Dec. 31, 1946.    C. NYGREN    2,413,645
STUFFING BOX FOR WATER COOLED SHAFTS
Filed April 12, 1944    3 Sheets-Sheet 3
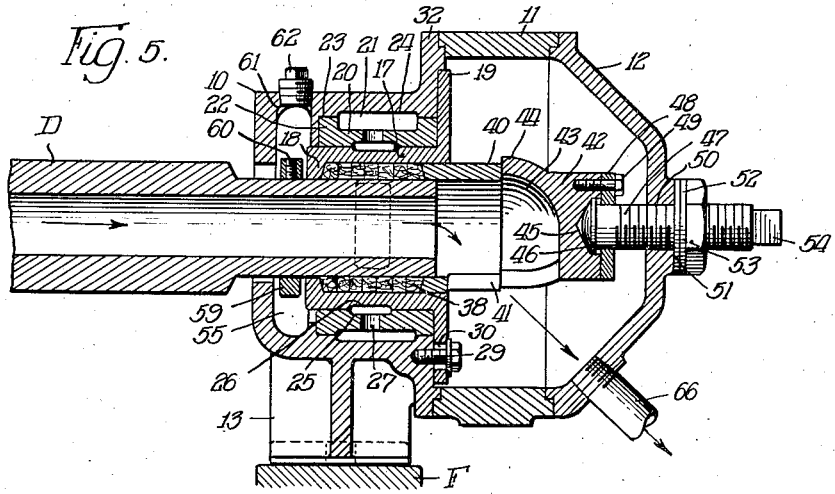
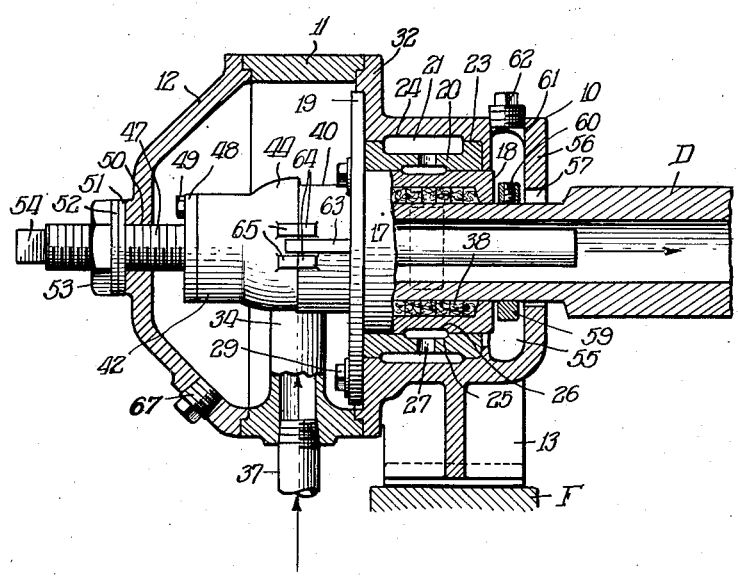
INVENTOR.
Carl Nygren, Patented Dec. 31, 1946

2,413,645

UNITED STATES PATENT OFFICE 2,413,645

STUFFING BOX FOR WATER-COOLED SHAFTS

Carl Nygren, Michigan City, Ind., assignor to Michiana Products Corporation, Michigan City, Ind., a corporation of Indiana Application April 12, 1944, Serial No. 530,699

8 Claims. (Cl. 285—10)

Centrifugal fans used in high temperature heat treating furnaces operate in temperatures of 1600° Fahrenheit, or more, at 1200 revolutions per minute, or higher, and a 30 inch fan may weigh in excess of 600 pounds. From this, it will be apparent that the supporting shafts are likely to warp enough to throw the heavy fan out of dynamic balance, which, of course, will result in early failure. For that reason, the shafts are preferably water cooled; that is, cooling water is fed into the hollow shaft at one end and out at the other to continuously bathe it from end to end and hold its temperature within safe limits, regardless of the temperature of the air or gases that the fan is propelling.

Stuffing boxes are used to make the watertight connections at the ends of the shaft, and they must be accurately aligned with the shaft to prevent leakage. Heretofore, shims have been used under the stuffing box housing to effect the adjustment for height, and the procedure has been tedious and costly. Rarely, if ever, has it given satisfactory results. In addition, the adjustment of the packing glands for applying the right pressure to the packing has required such extraordinary care and skill that maladjustment has been the rule.

The principal object of this invention is to provide a stuffing box arrangement with which the adjustments can be made easily and quickly. Generally speaking, this is accomplished by mounting the stuffing box in an eccentric rotatable in the main or supporting housing through a suitable opening in the side of it, and adjusting the gland by a single screw bolt projecting through the housing for ready rotation while the assembly is in regular operation.

In the accompanying drawings, a preferred embodiment of the invention is shown.

Fig. 1 is a somewhat diagrammatic sectional view through a part of the furnace showing the fan installation;

Fig. 2 is a vertical section through the stuffing box arrangement at the inlet water connection;

Figs. 3 and 4 are sectional views taken on the lines 3—3 and 4—4, respectively, of Fig. 2;

Fig. 5 is a vertical section similar to Fig. 2 through the stuffing box arrangement at the outlet connection; and Fig. 6 is a sectional view similar to Fig. 2 but showing the stuffing box gland and its adjusting shoe in elevation and interlocked with the stuffing box to prevent relative rotation during adjustment.

But these specific drawings and the corresponding description are used for the purpose of disclosure only and are not intended to impose unnecessary limitations on the claims.

The general arrangement is shown in Fig. 1 where A indicates the masonry of the furnace, B the fan housing, C the fan, D the hollow fan shaft, E, E the fan shaft bearings on the pillow FF, and G indicates, generally, the housing for the stuffing box arrangement at the inlet for water, and H the housing for the stuffing box arrangement at the outlet.

To give an idea of the size, this figure is taken from an installation in which the bearings E, E are 74 inches on centers; the fan is 30 inches in diameter; the shaft has an internal diameter of 1⅜ inches; it is driven at 1180 revolutions per minute; and the normal working temperature in the fan casing is 1600° Fahrenheit.

The arrows I and O indicate the inlet and outlet for water, and the path is generally indicated by the arrows running between them.

For details of the fan construction, reference is made to my copending application Ser. No. 536,801, filed May 22, 1944.

The detail of the stuffing box arrangement at the inlet is shown in Figs. 2, 3, 4, and 6. In these figures, it may be assumed that the shaft D has been mounted in the bearings E as shown in Fig. 1, and therefore its axial position is fixed.

The stuffing box arrangement at the inlet is carried by, and partly housed in, the housing generally indicated by G, which is composed of three pieces: First, a main or supporting housing 10; an intermediate section 11; and a cover 12. The main or supporting housing is generally cylindrical, as appears best in Fig. 4, and is formed in one piece with a sort of pedestal 13 having feet 14 provided with slotted openings 15 through which bolts 16 pass into the pier F to mount the housing in position. Ordinarily, there will be no difficulty in making that mounting so as to bring the stuffing box within approximate alignment with respect to the shaft D; for example, within ⅛ to ¼ of an inch.

The stuffing box 17, having a narrow internal flange 18 at one end and a wide external flange 19 at the other end, is mounted within an eccentric 20 journaled in the cylindrical bore 21 of the main or supporting housing 10.

In order to reduce the machine work necessary, the eccentric is provided with flanges 22 at its ends, machined to fit the machined surfaces 23 at each side of the grooves 24 in the housing 10. Internally, the eccentric is provided with a groove 25 opposite to an external groove 26 in the packing gland to reduce the machining on the contacting surfaces between those two parts. The eccentric is also provided with a plurality of radial openings 27 to receive a tool inserted through one of the side openings 28 in the cylindrical wall of the main supporting housing 10 to rotate the eccentric and bring about the adjustment of the stuffing box with respect to the axis of the shaft D.

This adjustment is effected when the intermediate section 11 and the cover 12 are removed. Hence, by looking at the exposed ends of the stuffing box 17 and the shaft D, they can be brought accurately into alignment vertically. Then, by loosening the bolts 16 and tapping the main housing 10, they can be brought into alignment horizontally, and the adjustment will be complete. That adjustment is then fixed by three cap screws 29 inserted through enlarged openings 30 in the flange 19 of the stuffing box and tightened up against washers 31. These screws thus serve to fasten the stuffing box in a fixed relation to the main housing 10, and the proportions of the parts are such that this also clamps the eccentric 20 in its adjusted position.

The intermediate section 11 is fitted to, and made fast to, an external flange 32 on the left end of the main housing 10 in Fig. 2, where it is made fast by four screws, which do not appear in the section but are located at 68 in the enlargements 33 in Fig. 3. This intermediate section 11 has integral with it a gooseneck inlet passage 34, the horizontal end 35 of which is fitted with a piece of ¾ inch standard inlet tubing 36, 6 inches long and projecting into the 1⅜ inch bore of the shaft D, as shown in Fig. 2. Merely bringing the intermediate section 11 into position after the adjustments above described will be sufficient to align the inlet tube 36 with the shaft. The inlet connection is completed by inserting a length of standard ¾ inch pipe 37 into the vertical end of the gooseneck 34.

The stuffing box 17 is fitted with suitable packing 38, usually in the form of rings, as shown in Fig. 2, between the stuffing box and the shaft 10 and resting against the internal flange 18. This packing is adjusted to form a seal between the stuffing box and the shaft by compressing it against the flange 18 with a stuffing box gland 40, telescoping within the stuffing box 17 and over the end of the shaft as shown in Fig. 2, its lower side being cut away at 41 to clear the gooseneck 34.

The gland is adjusted by an adjusting shoe 42 having a somewhat spherical opening 43 to make clearance for the gooseneck, and having a rim 44 bearing against the left end of the packing gland 40 in Fig. 2.

The adjusting shoe is provided with a conical socket 45 to receive a frusto-conical head 46 on an adjusting screw 47, which is made fast and swiveled to the adjusting shoe by a cap 48 and three cap screws 49. The adjusting screw 47 is threaded into the bore 50 in the cover 12 and passes through a packing 51 and a washer 52, beyond which it is fitted with a lock nut 53, and at its extreme end is a wrench seat 54.

When the packing gland is to be adjusted inwardly, the lock nut 53 is released and the adjusting screw 47 turned to the right, taking with it the shoe 42 and forcing the packing gland 40 to the right, compressing the packing against the flange 18 and making it spread into contact with the inner surface of the stuffing box 17 and the outer surface of the shaft D.

The main or supporting housing 10 is provided with a pick-up chamber 55 at the right of the stuffing box gland and adjacent to the end wall 56, through which an opening 57 is provided to receive the shaft D with appropriate clearance. Any water leaking past the gland is caught in the pick-up chamber and taken away by a suitable drain 58 (Fig. 4). A baffle ring 59, fixed to the shaft D by a set screw 60, catches any water working past the stuffing box and directs it into the lower portion of the pick-up chamber. The set screw 60 is screwed down by a tool inserted through the opening 61 in the top of the main housing 10 and ordinarily closed by a straight plug 62.

In order to restrain relative rotation between the stuffing box 17 and both the gland 40 and the adjusting shoe 42, the stuffing box is provided with two ribs 63 (Figs. 3 and 6), which are received between spaced lugs 64 on the gland 40 and 65 on the adjusting shoe 42. The clearances between the ribs and the lugs are such as to permit free movement but restrain the relative rotation.

The stuffing box arrangement at the outlet is shown in detail in Fig. 5, and a comparison of that figure with Fig. 2 will make it apparent that they are identical with the following exceptions: First, the intermediate section 11 has no gooseneck 34, and hence no pipe 37 or inlet pipe 36 is needed. Second, the cover 12, instead of having a drain plug 67, is fitted with an outlet pipe 66. Otherwise, the arrangements and adjustments and assembly are the same at both ends of the shaft.

The cover 12 in both instances is made fast to the intermediate section 11 by four cap screws 68, in the enlargements 33 in Fig. 3.

I claim:

1. In a device of the class described, a housing having an opening to receive a rotatable shaft, an eccentric rotatable in the housing, a stuffing box mounted in the eccentric and adapted to surround the shaft, and means for locking the eccentric in rotatably adjusted position.

2. In a device of the class described, a housing having an opening to receive a rotatable shaft, an eccentric journaled in the housing for rotation through an adjusting opening in the housing, a stuffing box mounted in the eccentric adapted to surround the rotatable shaft, and means for locking the eccentric in rotatably adjusted position.

3. In a device of the class described, a housing having an opening to receive a rotatably driven shaft, an eccentric rotatably mounted in the housing around the shaft, a stuffing box for the shaft mounted in the eccentric, and common means for locking the eccentric in rotatably adjusted position in the housing and for locking the stuffing box in the housing.

4. In a device of the class described, a housing having an opening to receive a rotatably driven shaft, an eccentric rotatably mounted in the housing around the shaft, a stuffing box for the shaft mounted in the eccentric and having at one end a flange overlapping the eccentric and a portion of the housing, and means for fixing said flange to said portion of the housing so as to clamp the eccentric in rotatably adjusted position in the housing.

5. In a device of the class described, a housing having an opening to receive a rotatably driven shaft, an eccentric rotatably mounted in the housing around the shaft, a stuffing box for the shaft mounted in the eccentric and having at one end a flange overlapping the eccentric and a portion of the housing, and a cap screw extending into said portion of the housing through an enlarged opening in the stuffing box flange and clamping the eccentric between said flange and the housing, whereby the eccentric may be clamped in rotatably adjusted position in the housing and the shaft and stuffing box may be shifted therewith.

6. In a device of the class described, a housing having an opening to receive a rotatably driven shaft, means mounting the housing on a support and adjustable laterally, an eccentric rotatably mounted in the housing around the shaft, and means for fixing the eccentric in rotatably adjusted position in the housing whereby the elevation of the shaft may be adjusted by rotating the eccentric and undesired lateral displacement of the shaft resulting from such adjustment may be compensated by laterally adjusting the housing on the support.

7. In a device of the class described, a housing having an opening for a rotatable shaft, a stuffing box in the housing for the shaft, a gland adjustable lengthwise to the stuffing box, a gland adjuster including an outer portion screw threaded through the housing and an inner portion bearing against the gland, and means fixed relatively to the housing penetrating opposed openings in the gland and the inner portion of the adjuster to prevent relative rotation of the gland and said inner portion.

8. In a device of the class described, a housing having an opening for a rotatable shaft, a stuffing box in the housing for the shaft, a gland adjustable lengthwise to the stuffing box, and a gland adjuster including an outer screw threaded through the housing and an inner shoe rotatably mounted on the screw, bearing against the gland and interlocked therewith to prevent relative rotation of the gland and shoe.

CARL NYGREN.